US012411509B2

(12) United States Patent
Gao et al.

(10) Patent No.: US 12,411,509 B2
(45) Date of Patent: Sep. 9, 2025

(54) LDO CIRCUIT HAVING POWER SUPPLY REJECTION FUNCTION, CHIP AND COMMUNICATION TERMINAL

(71) Applicant: VANCHIP (TIANJIN) TECHNOLOGY CO., LTD., Tianjin (CN)

(72) Inventors: Chenyang Gao, Tianjin (CN); Sheng Lin, Tianjin (CN)

(73) Assignee: VANCHIP (TIANJIN) TECHNOLOGY CO., LTD., Tianjin (CN)

( * ) Notice: Subject to any disclaimer, the term of this patent is extended or adjusted under 35 U.S.C. 154(b) by 55 days.

(21) Appl. No.: 18/423,207

(22) Filed: Jan. 25, 2024

(65) Prior Publication Data

US 2024/0281012 A1 Aug. 22, 2024

Related U.S. Application Data

(63) Continuation of application No. PCT/CN2022/107152, filed on Jul. 21, 2022.

(30) Foreign Application Priority Data

Jul. 30, 2021 (CN) ......................... 202110867707.2

(51) Int. Cl.

| | |
|---|---|
| ***G05F 1/567*** | (2006.01) |
| ***G05F 1/56*** | (2006.01) |
| ***G05F 1/575*** | (2006.01) |
| ***G05F 3/30*** | (2006.01) |

(52) U.S. Cl.
CPC ................ *G05F 1/567* (2013.01); *G05F 1/56* (2013.01); *G05F 1/575* (2013.01); *G05F 3/30* (2013.01)

(58) Field of Classification Search
CPC . G05F 1/567; G05F 1/575; G05F 1/56; G05F 3/30
See application file for complete search history.

(56) References Cited

U.S. PATENT DOCUMENTS

| | | | | |
|---|---|---|---|---|
| 5,889,393 | A * | 3/1999 | Wrathall | G05F 1/565 323/280 |
| 7,629,845 | B2 * | 12/2009 | Kao | H03F 3/45183 330/253 |
| 9,804,631 | B2 * | 10/2017 | Fort | G05F 3/267 |
| 10,416,695 | B1 * | 9/2019 | Bohannon | H03F 3/45192 |

(Continued)

*Primary Examiner* — Yusef A Ahmed

(74) *Attorney, Agent, or Firm* — George Guosheng Wang; Upstream Research and Patent LLC

(57) ABSTRACT

An LDO circuit having a power supply rejection function, a chip, and a communication terminal. The LDO circuit includes a bandgap reference module provided with an intermediate frequency zero adjustment unit, an amplification module provided with an intermediate frequency zero generation unit, and a power output module. The bandgap reference module is connected to the amplification module, and the amplification module is connected to the power output module. For the purpose of power supply rejection at an intermediate frequency, the intermediate frequency zero adjustment unit in the bandgap reference module and the intermediate frequency zero generation unit in the LDO circuit are adjusted in coordination to better optimize the intermediate frequency power supply rejection performance.

7 Claims, 5 Drawing Sheets

(56) References Cited

U.S. PATENT DOCUMENTS

| | | | | |
|---|---|---|---|---|
| 2006/0170404 | A1* | 8/2006 | Amrani | G05F 1/565 323/282 |
| 2006/0208790 | A1* | 9/2006 | Tadeparthy | G05F 3/30 327/541 |
| 2007/0159146 | A1* | 7/2007 | Mandal | G05F 1/575 323/280 |
| 2009/0128107 | A1* | 5/2009 | Wang | G05F 1/575 323/280 |
| 2010/0066320 | A1* | 3/2010 | Dasgupta | G05F 1/56 323/273 |
| 2012/0081099 | A1* | 4/2012 | Melanson | G05F 3/30 323/313 |
| 2012/0293149 | A1* | 11/2012 | Fort | G05F 3/30 323/282 |
| 2014/0191739 | A1* | 7/2014 | Kim | G05F 1/575 323/280 |
| 2017/0315574 | A1* | 11/2017 | Brown | G05F 1/468 |
| 2018/0034414 | A1* | 2/2018 | Niu | H03F 3/245 |
| 2019/0187735 | A1* | 6/2019 | Ramos | G05F 1/575 |
| 2019/0258282 | A1* | 8/2019 | Magod Ramakrishna | G05F 1/575 |
| 2021/0311513 | A1* | 10/2021 | Joshi | G05F 1/575 |
| 2023/0195155 | A1* | 6/2023 | Gao | G05F 3/26 323/280 |
| 2023/0229182 | A1* | 7/2023 | Zhang | G05F 1/565 323/280 |
| 2024/0152172 | A1* | 5/2024 | Chen | G05F 1/468 |

* cited by examiner

LDO CIRCUIT HAVING POWER SUPPLY REJECTION FUNCTION, CHIP AND COMMUNICATION TERMINAL

BACKGROUND

Technical Field

The present invention relates to an LDO circuit having a power supply rejection function, also relates to an integrated circuit chip and a corresponding communication terminal both including the LDO circuit, and relates to the field of radio frequency circuit technologies.

Related Art

With the development of communication technologies, an application environment of a chip in a communication terminal is becoming increasingly more complex. Usually, one communication terminal includes a CPU, a power management chip, a memory chip, a clock chip, a peripheral circuit, a radio frequency chip, and the like, and each part is powered by a same power supply. The CPU, the power management chip, the memory chip, the clock chip, the peripheral circuit, and the like may generate some intermediate frequency signals (100 KHz to 10 MHZ). These intermediate frequency signals may enter a voltage bias circuit of the radio frequency chip through the power supply, and then interfere with and deteriorate performance such as radio frequency chip modulation spectrum, switching spectrum, and noise, seriously limiting the development of radio frequency communication technologies.

A low dropout regulator (low dropout regulator, LDO for short) is a voltage bias circuit commonly used in a radio frequency chip. A main function of the regulator is to provide a direct current voltage operating point for the radio frequency chip. To reduce interference of the intermediate frequency signals inside the communication terminal to the radio frequency chip and enhance a capability of the power supply to suppress the intermediate frequency signals, it is necessary to provide an LDO circuit having a high-performance intermediate frequency power supply rejection (Power Supply Rejection, PSR for short) function.

SUMMARY

A primary technical problem to be resolved in the present invention is to provide an LDO circuit having a power supply rejection function.

Another technical problem to be resolved in the present invention is to provide a chip and a communication terminal both including the LDO circuit having a power supply rejection function.

To achieve the above objectives, the following technical solutions are used in the present invention:

According to a first aspect of an embodiment of the present invention, an LDO circuit having a power supply rejection function is provided, including a bandgap reference module provided with an intermediate frequency zero adjustment unit, an amplifier module provided with an intermediate frequency zero generation unit, and a power output module. The bandgap reference module is connected to the amplifier module. The amplifier module is connected to the power output module.

The bandgap reference module generates a reference voltage having a preset temperature coefficient by using a frequency of an intermediate frequency zero adjusted by the intermediate frequency zero adjustment unit and outputs the reference voltage to the amplifier module. The reference voltage is used as a voltage reference of the LDO circuit, and works in coordination with a zero that is generated by the intermediate frequency zero generation unit and whose frequency is an intermediate frequency, to adjust power supply rejection of the LDO circuit at an intermediate frequency.

Preferably, the bandgap reference module includes a starting unit, a PTAT current generation unit, an output unit, and the intermediate frequency zero adjustment unit. An output end of the starting unit and an output end of the intermediate frequency zero adjustment unit are connected to an input end of the PTAT current generation unit. An output end of the PTAT current generation unit is connected to an input end of the output unit. An output end of the output unit is connected to an input end of the amplifier module.

Preferably, the starting unit includes a first PMOS transistor, a second PMOS transistor, a first resistor, a second resistor, a first NMOS transistor, a second NMOS transistor, a third PMOS transistor, a fourth PMOS transistor, a third NMOS transistor, and a fourth NMOS transistor. A source of the first PMOS transistor and a source of the second PMOS transistor are connected to a power supply voltage. A drain of the second PMOS transistor is connected to one end of the first resistor. The other end of the first resistor is connected to a drain of the first PMOS transistor, a gate of the fourth PMOS transistor, and one end of the second resistor. The other end of the second resistor is connected to a gate and a drain of the first NMOS transistor. A drain of the fourth PMOS transistor is connected to a gate and a drain of the third NMOS transistor and a gate of the fourth NMOS transistor. A drain of the fourth NMOS transistor, a source of the fourth PMOS transistor, and a drain of the third PMOS transistor are connected to each other, and are connected to the PTAT current generation unit with a gate of the second PMOS transistor. A gate of the first PMOS transistor, a gate of the second NMOS transistor, and a gate of the third PMOS transistor each are connected to an external enable signal. The source of the first PMOS transistor, the source of the second PMOS transistor, and a source of the third PMOS transistor are connected to the power supply voltage. A source of the second NMOS transistor, a source of the third NMOS transistor, and a source of the fourth NMOS transistor are grounded.

Preferably, the PTAT current generation unit includes a fifth PMOS transistor, a sixth PMOS transistor, a seventh PMOS transistor, an eighth PMOS transistor, a ninth PMOS transistor, a third resistor, a fourth resistor, a fifth NMOS transistor, a sixth NMOS transistor, a seventh NMOS transistor, an eighth NMOS transistor, a fifth resistor, a first bipolar transistor, and a second bipolar transistor. A gate of the fifth PMOS transistor is connected to an external enable signal. A drain of the fifth PMOS transistor, a gate of the sixth PMOS transistor, a gate of the seventh PMOS transistor, the gate of the second PMOS transistor, a drain of the ninth PMOS transistor, one end of the third resistor, and the output unit are connected to each other. A drain of the sixth PMOS transistor is connected to a source of the eighth PMOS transistor. A drain of the seventh PMOS transistor is connected to a source of the ninth PMOS transistor. A gate of the eighth PMOS transistor, a gate of the ninth PMOS transistor, the drain of the third PMOS transistor, the source of the fourth PMOS transistor, the other end of the third resistor, a drain of the seventh NMOS transistor, and the output unit are connected to each other. A drain of the eighth PMOS transistor is connected to one end of the fourth resistor, a gate of the fifth NMOS transistor, and a gate of the seventh NMOS transistor. The other end of the fourth resistor is connected to a drain of the fifth NMOS transistor, a gate of the sixth NMOS transistor, and a gate of the eighth NMOS transistor. A source of the fifth NMOS transistor is connected to a drain of the sixth NMOS transistor. A source of the seventh NMOS transistor is connected to a drain of the eighth NMOS transistor. A source of the sixth NMOS transistor is connected to an emitter of the first bipolar transistor. A source of the eighth NMOS transistor is connected to an emitter of the second bipolar transistor via the fifth resistor. A source of the fifth PMOS transistor, a source of the sixth PMOS transistor, and a source of the seventh PMOS transistor are connected to the power supply voltage. A base and a collector of the first bipolar transistor and a base and a collector of the second bipolar transistor are all grounded.

Preferably, the output unit includes a tenth PMOS transistor, an eleventh PMOS transistor, a sixth resistor, a third bipolar transistor, a twelfth PMOS transistor, and a thirteenth PMOS transistor. A gate of the tenth PMOS transistor and a gate of the twelfth PMOS transistor are connected to the drain of the ninth PMOS transistor and the intermediate frequency zero adjustment unit. A drain of the tenth PMOS transistor is connected to a source of the eleventh PMOS transistor. A drain of the twelfth PMOS transistor is connected to a source of the thirteenth PMOS transistor. A gate of the eleventh PMOS transistor and a gate of the thirteenth PMOS transistor are connected to the other end of the third resistor and the intermediate frequency zero adjustment unit. A drain of the eleventh PMOS transistor and one end of the sixth resistor are connected to the amplifier module. The other end of the sixth resistor is connected to an emitter of the third bipolar transistor. A drain of the thirteenth PMOS transistor is connected to the amplifier module. A source of the tenth PMOS transistor and a source of the twelfth PMOS transistor are connected to the power supply voltage. A base and a collector of the third bipolar transistor are grounded.

Preferably, the intermediate frequency zero adjustment unit includes a first capacitor and a second capacitor. One end of the first capacitor and one end of the second capacitor are connected to the power supply voltage. The other end of the first capacitor is connected to the gate of the sixth PMOS transistor, the gate of the seventh PMOS transistor, the gate of the tenth PMOS transistor, and the gate of the twelfth PMOS transistor. The other end of the second capacitor is connected to the gate of the eighth PMOS transistor, the gate of the ninth PMOS transistor, the gate of the eleventh PMOS transistor, and the gate of the thirteenth PMOS transistor.

Preferably, the amplifier module includes a first-stage amplifier unit, a second-stage amplifier unit, and the intermediate frequency zero generation unit configured between the first-stage amplifier unit and the second-stage amplifier unit. The first-stage amplifier unit is connected to the second-stage amplifier unit and the power output module.

Preferably, the intermediate frequency zero generation unit includes a tenth resistor and a fourth capacitor connected in series to ground.

According to a second aspect of an embodiment of the present invention, an integrated circuit chip is provided. The integrated circuit chip includes the LDO circuit having a power supply rejection function.

According to a third aspect of an embodiment of the present invention, a communication terminal is provided. The communication terminal includes the LDO circuit having a power supply rejection function.

In the LDO circuit having a power supply rejection function provided in the present invention, with respect to power supply rejection at an intermediate frequency, the intermediate frequency zero adjustment unit in the bandgap reference module and the intermediate frequency zero generation unit in the LDO circuit are adjusted in coordination to better optimize intermediate frequency power supply rejection performance. When used as a voltage bias circuit of a radio frequency chip, the LDO circuit having the intermediate frequency power supply rejection function can enhance a capability of a radio frequency chip power supply to suppress intermediate frequency signals, thereby improving working performance of the radio frequency chip.

DETAILED DESCRIPTION

The technical content of the present invention is further described below with reference to the accompanying drawings and the specific embodiments.

Figure 1:
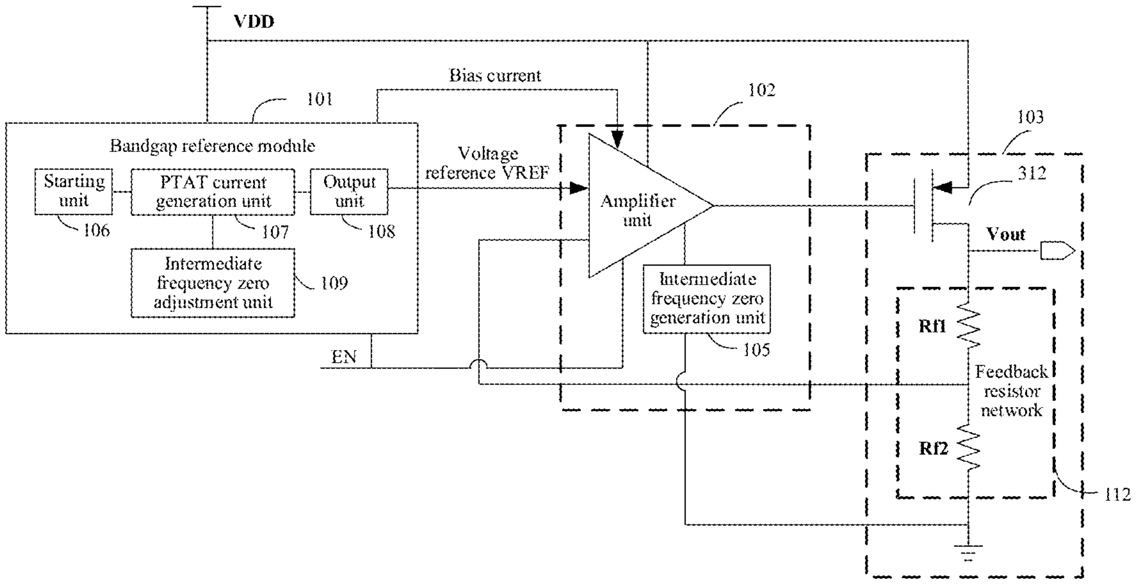
FIG. 1 is a schematic diagram of an LDO circuit having a power supply rejection function according to an embodiment of the present invention.

To improve an anti-interference capability of a radio frequency chip to intermediate frequency signals in a complex application environment to improve working performance of the radio frequency chip, as shown in FIG. 1, an embodiment of the present invention provides an LDO circuit having a power supply rejection function, including a bandgap reference module 101 provided with an intermediate frequency zero adjustment unit 109, an amplifier module 102 provided with an intermediate frequency zero generation unit 105, and a power output module 103. The bandgap reference module 101 is connected to the amplifier module 102. The amplifier module 102 is connected to the power output module 103.

The bandgap reference module 101 generates a reference voltage having a preset temperature coefficient and having an intermediate frequency power supply rejection function by using a frequency of an intermediate frequency zero adjusted by the intermediate frequency zero adjustment unit 109 and outputs the reference voltage to the amplifier module 102. The reference voltage is used as a voltage reference of the LDO circuit, and works in coordination with a zero that is generated by the intermediate frequency zero generation unit 105 and that is used for changing frequency response of the amplifier module 102 at an intermediate frequency to be an intermediate frequency, to improve intermediate frequency power supply rejection performance of the LDO circuit.

As shown in FIG. 1, the bandgap reference module 101 includes a starting unit 106, a proportional to absolute temperature (Proportional To Absolute Temperature, PTAT) current generation unit 107, an output unit 108, and the intermediate frequency zero adjustment unit 109. An output end of the starting unit 106 and an output end of the intermediate frequency zero adjustment unit 109 are connected to an input end of the PTAT current generation unit 107. An output end of the PTAT current generation unit 107 is connected to an input end of the output unit 108. An output end of the output unit 108 is connected to the amplifier module 102.

It should be emphasized that in the present invention, an implementation process that the bandgap reference module 101 provides a reference voltage VREF having a preset temperature coefficient (which is generally a zero-temperature coefficient) and having an intermediate frequency power supply rejection function for the amplifier module 102 is mainly described in detail. However, that the bandgap reference module 101 may further provide a bias current for the amplifier module 102 is a well-known existing technology. Details are not described herein.

Figure 2:
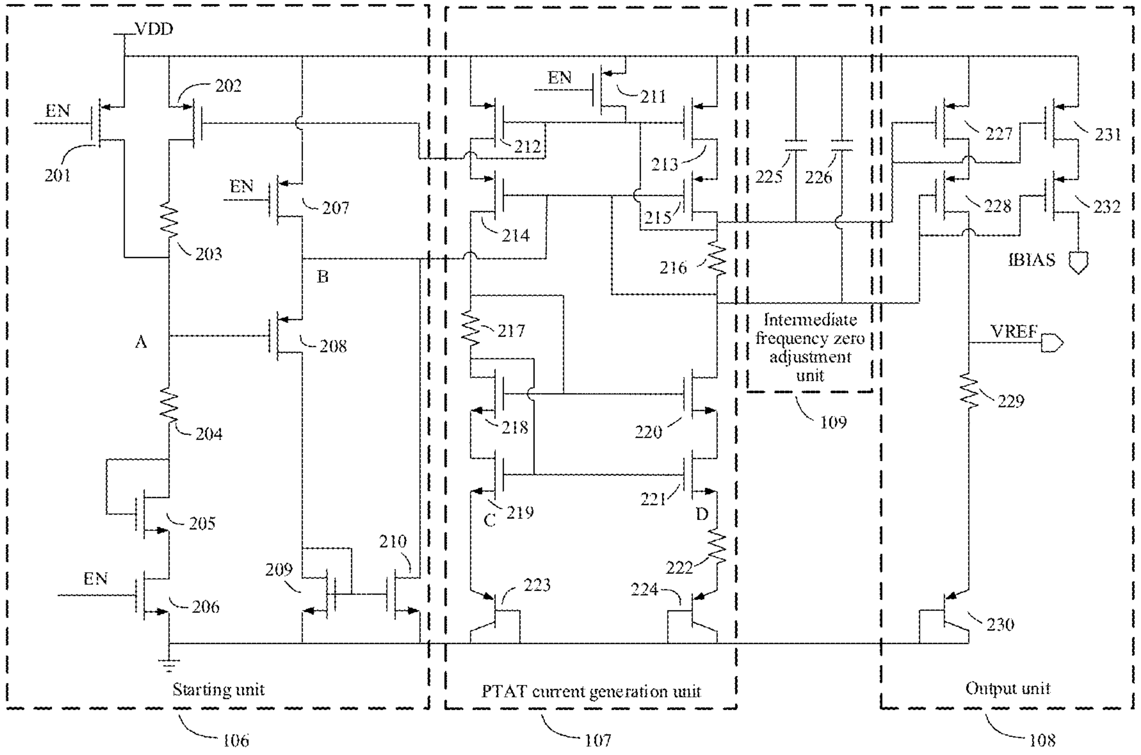
FIG. 2 is a schematic diagram of a circuit of a bandgap reference module in an LDO circuit having a power supply rejection function according to an embodiment of the present invention.

Specifically, the starting unit 106 is configured to enable the PTAT current generation unit 107 to avoid a degeneracy point where a current is 0, to ensure that the PTAT current generation unit 107 starts normally and is stable. As shown in FIG. 2, the starting unit 106 includes a first PMOS transistor 201, a second PMOS transistor 202, a first resistor 203, a second resistor 204, a first NMOS transistor 205, a second NMOS transistor 206, a third PMOS transistor 207, a fourth PMOS transistor 208, a third NMOS transistor 209, and a fourth NMOS transistor 210. A connection relationship between each part of the starting unit 106 is as follows: A source of the first PMOS transistor 201 and a source of the second PMOS transistor 202 are connected to a power supply voltage VDD. A drain of the second PMOS transistor 202 is connected to one end of the first resistor 203. The other end of the first resistor 203 is connected to a drain of the first PMOS transistor 201, a gate of the fourth PMOS transistor 208, and one end of the second resistor 204. The other end of the second resistor 204 is connected to a gate and a drain of the first NMOS transistor 205. A drain of the fourth PMOS transistor 208 is connected to a gate and a drain of the third NMOS transistor 209 and a gate of the fourth NMOS transistor 210. A drain of the fourth NMOS transistor 210, a source of the fourth PMOS transistor 208, and a drain of the third PMOS transistor 207 are connected to each other, and are connected to a corresponding position of the PTAT current generation unit 107 with a gate of the second PMOS transistor 202. A gate of the first PMOS transistor 201, a gate of the second NMOS transistor 206, and a gate of the third PMOS transistor 207 each are connected to an external enable signal EN. The source of the first PMOS transistor 201, the source of the second PMOS transistor 202, and a source of the third PMOS transistor 207 are connected to the power supply voltage VDD. A source of the second NMOS transistor 206, a source of the third NMOS transistor 209, and a source of the fourth NMOS transistor 210 are grounded.

The PTAT current generation unit 107 uses a R $\Delta V_{BE}$/R principle to generate a current proportional to the temperature. As shown in FIG. 2, the PTAT current generation unit 107 includes a fifth PMOS transistor 211, a sixth PMOS transistor 212, a seventh PMOS transistor 213, an eighth PMOS transistor 214, a ninth PMOS transistor 215, a third resistor 216, a fourth resistor 217, a fifth NMOS transistor 218, a sixth NMOS transistor 219, a seventh NMOS transistor 220, an eighth NMOS transistor 221, a fifth resistor 222, a first bipolar transistor 223, and a second bipolar transistor 224. A connection relationship between each part of the PTAT current generation unit 107 is as follows: A gate of the fifth PMOS transistor 211 is connected to an external enable signal. A drain of the fifth PMOS transistor 211, a gate of the sixth PMOS transistor 212, a gate of the seventh PMOS transistor 213, the gate of the second PMOS transistor 202, a drain of the ninth PMOS transistor 215, one end of the third resistor 216, and a corresponding position of the output unit 108 are connected to each other. A drain of the sixth PMOS transistor 212 is connected to a source of the eighth PMOS transistor 214. A drain of the seventh PMOS transistor 213 is connected to a source of the ninth PMOS transistor 215. A gate of the eighth PMOS transistor 214, a gate of the ninth PMOS transistor 215, the drain of the third PMOS transistor 207, the source of the fourth PMOS transistor 208, the other end of the third resistor 216, a drain of the seventh NMOS transistor 220, and the corresponding position of the output unit 108 are connected to each other. A drain of the eighth PMOS transistor 214 is connected to one end of the fourth resistor 217, a gate of the fifth NMOS transistor 218, and a gate of the seventh NMOS transistor 220. The other end of the fourth resistor 217 is connected to a drain of the fifth NMOS transistor 218, a gate of the sixth NMOS transistor 219, and a gate of the eighth NMOS transistor 221. A source of the fifth NMOS transistor 218 is connected to a drain of the sixth NMOS transistor 219. A source of the seventh NMOS transistor 220 is connected to a drain of the eighth NMOS transistor 221. A source of the sixth NMOS transistor 219 is connected to an emitter of the first bipolar transistor 223. A source of the eighth NMOS transistor 221 is connected to an emitter of the second bipolar transistor 224 via the fifth resistor 222. A source of the fifth PMOS transistor 211, a source of the sixth PMOS transistor 212, and a source of the seventh PMOS transistor 213 are connected to the power supply voltage VDD. A base and a collector of the first bipolar transistor 223 and a base and a collector of the second bipolar transistor 224 are all grounded.

The first PMOS transistor 201, the second NMOS transistor 206, the third PMOS transistor 207, and the fifth PMOS transistor 211 are used as enable control transistors to control on and off of the bandgap reference module 101. When the enable signal EN is a low level, the first PMOS transistor 201, the third PMOS transistor 207, and the fifth PMOS transistor 211 are turned on, the second NMOS transistor 206 is turned off, and the bandgap reference module 101 is off. When the enable signal EN changes from the low level to a high level, the first PMOS transistor 201, the third PMOS transistor 207, and the fifth PMOS transistor 211 are turned off, and the second NMOS transistor 206 is turned on. A branch including the second PMOS transistor 202, the first resistor 203, the second resistor 204, the first NMOS transistor 205, and the second NMOS transistor 206 is on, and a voltage VA at a node A is lowered. The fourth PMOS transistor 208 is turned on and a current is generated. The third NMOS transistor 209 and the fourth NMOS transistor 210 constitute a current mirror. The fourth NMOS transistor 210 is turned on, and a voltage VB at a node B is lower. The eighth PMOS transistor 214 and the ninth PMOS transistor 215 are turned on to enable the PTAT current generation unit 107 to avoid a degeneracy point where a current is 0 and to be started. After the PTAT current generation unit 107 is stable, the voltage VA at the node A is greater than the voltage VB at the node B, the fourth PMOS transistor 208 is turned off, and the startup of the PTAT current generation unit 107 is completed. The fifth PMOS transistor 211, the sixth PMOS transistor 212, the seventh PMOS transistor 213, the eighth PMOS transistor 214, the ninth PMOS transistor 215, the third resistor 216, the fourth resistor 217, the fifth NMOS transistor 218, the sixth NMOS transistor 219, the seventh NMOS transistor 220, the eighth NMOS transistor 221 constitute a cascode current mirror bootstrap circuit. Currents in the left and the right branches are equal, and clamping of a node C and a node D is implemented, so that a voltage VC at the node C and a voltage VD at the node D are approximately equal, that is VC=VD, VC=$V_{BE\_}$ 223 (which is a base-emitter voltage of the first bipolar transistor 223), and VD=$V_{BE\_}$ 224+$V_{222}$ (which is a sum of a base-emitter voltage of the second bipolar transistor 224 and a voltage drop across two ends of the fifth resistor 222). A difference between the base-emitter voltages of the first bipolar transistor 223 and the second bipolar transistor 224 is $\Delta V_{BE}$=InN*$V_T$, where N is a ratio of a quantity of the first bipolar transistor 223 and the second bipolar transistor 224 that are connected in parallel, and V is a thermal voltage between the bipolar transistors. An expression of $V_r$ is $$V_T = \frac{k}{q}T,$$

where k is a Boltzmann constant, q is electron charge, and T is an absolute temperature, that is, $$\Delta V_{BE} = InN * \frac{k}{q}T. \; InN * \frac{k}{q}$$

is a constant. Therefore, the difference $\Delta V_{BE}$ between the base-emitter voltages of the first bipolar transistor 223 and the second bipolar transistor 224 is proportional to the absolute temperature T. The voltage drop across two ends of the fifth resistor 222 is $V_{222}$=$\Delta V_{BE}$, and each current in the left and the right branches of the cascode current mirror bootstrap circuit is $$\frac{\Delta V_{BE}}{R222} = \frac{InN}{R222} * \frac{k}{q}T.$$

The current, that is, a PTAT current, is proportional to the absolute temperature T.

The output unit 108 generates a reference voltage VREF and a reference current IBIAS based on the current that is generated by PTAT current generation unit 107 and that is proportional to the temperature. As shown in FIG. 2, the output unit 108 includes a tenth PMOS transistor 227, an eleventh PMOS transistor 228, a sixth resistor 229, a third bipolar transistor 230, a twelfth PMOS transistor 231, and a thirteenth PMOS transistor 232. A connection relationship between each part of the output unit 108 is as follows: A gate of the tenth PMOS transistor 227 and a gate of the twelfth PMOS transistor 231 are connected to the drain of the ninth PMOS transistor 215 and the intermediate frequency zero adjustment unit 109. A drain of the tenth PMOS transistor 227 is connected to a source of the eleventh PMOS transistor 228. A drain of the twelfth PMOS transistor 231 is connected to a source of the thirteenth PMOS transistor 232. A gate of the eleventh PMOS transistor 228 and a gate of the thirteenth PMOS transistor 232 are connected to the other end of the third resistor 216 and the intermediate frequency zero adjustment unit 109. A drain of the eleventh PMOS transistor 228 and one end of the sixth resistor 229 are connected to the amplifier module 102, to provide the reference voltage VREF for the amplifier module 102. The other end of the sixth resistor 229 is connected to an emitter of the third bipolar transistor 230. A drain of the thirteenth PMOS transistor 232 is connected to the amplifier module 102, used for transmitting a reference current IBIAS to the amplifier module 102 to provide the bias current IBIAS for the amplifier module 102. A source of the tenth PMOS transistor 227 and a source of the twelfth PMOS transistor 231 are connected to the power supply voltage VDD. A base and a collector of the third bipolar transistor 230 are grounded.

Current mirrors are formed respectively by using the tenth PMOS transistor 227 and the eleventh PMOS transistor 228 as well as the twelfth PMOS transistor 231 and the thirteenth PMOS transistor 232. The PTAT current of the PTAT current generation unit 107 is copied to obtain the reference current IBIAS that is provided for the amplifier module 102 to be used as a bias current. The reference voltage VREF may be expressed as $$VREF = \left(\frac{InN}{R222} * \frac{k}{q}T\right) * R229 + V_{BE}.$$

$V_{BE}$ is the base-emitter voltage of the third bipolar transistor 230. The voltage is a voltage with a negative temperature coefficient. Therefore, a ratio of the fifth resistor 222 to the sixth resistor 229 is adjusted, and the reference voltage VREF may become a zero-temperature voltage that is provided for the amplifier module 102 to be used as a voltage reference.

The intermediate frequency zero adjustment unit 109 is configured to adjust a frequency of an intermediate frequency zero of the bandgap reference module 101 to improve the intermediate frequency power supply rejection performance of the bandgap reference module 101. As shown in FIG. 2, the intermediate frequency zero adjustment unit 109 includes a first capacitor 225 and a second capacitor 226. One end of the first capacitor 225 and one end of the second capacitor 226 are connected to the power supply voltage VDD. The other end of the first capacitor 225 is connected to the gate of the sixth PMOS transistor 212, the gate of the seventh PMOS transistor 213, the gate of the tenth PMOS transistor 227, and the gate of the twelfth PMOS transistor 231. The other end of the second capacitor 226 is connected to the gate of the eighth PMOS transistor 214, the gate of the ninth PMOS transistor 215, the gate of the eleventh PMOS transistor 228, and the gate of the thirteenth PMOS transistor 232.

In the bandgap reference module 101, the power supply voltage VDD is connected to the other ends of the first capacitor 225 and the second capacitor 226 through each PMOS transistor. Parasitic capacitances Cgs and Cgd in the gates exist from a branch to a reference voltage output end. A zero may be generated on the branch. A frequency of the zero is determined by a product of resistance (which is resistance of PMOS transistors) and capacitance on the branch. The frequency of the zero is changed by changing the capacitance, so that power supply rejection of the bandgap reference module 101 at the intermediate frequency is optimized. The frequency of the intermediate frequency zero is determined by both capacitance values of the first capacitor 225 and the second capacitor 226 as well as a ratio between the two capacitors. The capacitance values and the ratio of the first capacitor 225 to the second capacitor 226 may be adjusted with respect to the power supply rejection at the intermediate frequency, and a better optimization effect can be achieved. This is implemented by the following formula.

$$\frac{1}{R_{bg}C_{bg}} = \frac{1}{(r_{ds\_227} + r_{ds\_228})((((C_{gs1\_227} + C_{225}) // C_{gd1\_227} // C_{gs2\_228}) + C_{226}) // C_{gd2\_228})} \quad (1)$$

$R_{bg}$ is resistance on an intermediate frequency zero branch of the bandgap reference module 101. $C_{bg}$ is the capacitance on the intermediate frequency zero branch of the bandgap reference module 101. $T_{ds\_227}$ is equivalent alternating current resistance between the drain and the source of tenth PMOS transistor 227. $T_{ds\_228}$ is equivalent alternating current resistance between the drain and the source of the eleventh PMOS transistor 228. $C_{gs1\_227}$ is a parasitic capacitance between the gate and the source of the tenth PMOS transistor 227. $C_{225}$ is the capacitance value of the first capacitor 225. $C_{ed1\_227}$ is a parasitic capacitance between the gate and the drain of the tenth PMOS transistor 227. $C_{es2\_228}$ is a parasitic capacitance between the gate and the source of the eleventh PMOS transistor 228. $C_{226}$ is the capacitance value of the second capacitor 226. $C_{gd2\_228}$ is a parasitic capacitance between the gate and the drain of the eleventh PMOS transistor 228.//is a parallel symbol in a circuit.

Figure 3:
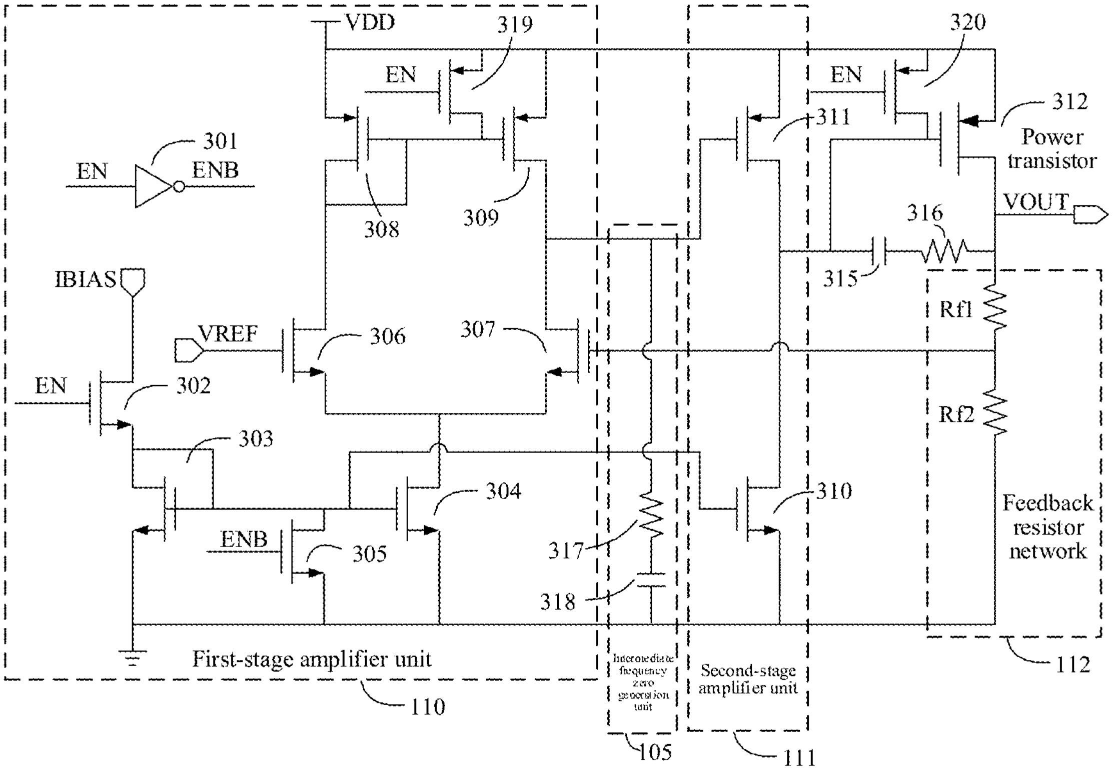
FIG. 3 is a schematic diagram of a circuit of an amplifier module and a power output module in an LDO circuit having a power supply rejection function according to an embodiment of the present invention.

As shown in FIG. 3, the amplifier module 102 includes a first-stage amplifier unit 110, a second-stage amplifier unit 111, and the intermediate frequency zero generation unit 105 configured between the first-stage amplifier unit 110 and the second-stage amplifier unit 111. The first-stage amplifier unit 110 is connected to the second-stage amplifier unit 111 and the power output module 103. The power output module 103 includes a power transistor 312, a sixteenth NMOS transistor 320, a third capacitor 315, a seventh resistor 316, and a feedback resistor network 112 including an eighth resistor Rf1 and a ninth resistor Rf2. A gate of the power transistor 312 is connected to a drain of the sixteenth NMOS transistor 320, one end of the third capacitor 315, and the second-stage amplifier unit 111. The other end of the third capacitor 315 is connected to one end of the seventh resistor 316. The other end of the seventh resistor 316 is connected to a drain of the power transistor 312 and one end of the eighth resistor Rf1. The other end of the eighth resistor Rf1 is connected to one end of the ninth resistor Rf2 and the first-stage amplifier unit 110. The other end of the ninth resistor Rf2 is grounded. A source of the power transistor 312 and a source of the sixteenth NMOS transistor 320 is connected to the power supply voltage VDD. A gate of the sixteenth NMOS transistor 320 is connected to an external enable signal.

As shown in FIG. 3, the first-stage amplifier unit 110 includes a phase inverter 301, a ninth NMOS transistor 302, a tenth NMOS transistor 303, an eleventh NMOS transistor 304, a twelfth NMOS transistor 305, a thirteenth NMOS transistor 306, a fourteenth NMOS transistor 307, a fourteenth PMOS transistor 308, a fifteenth PMOS transistor 309, and a sixteenth PMOS transistor 319. A connection relationship between each part of the first-stage amplifier unit 110 is as follows: An input end of the phase inverter 301 is connected to an external enable signal. An output end of the phase inverter 301 is connected to a gate of the twelfth NMOS transistor 305. A gate of the ninth NMOS transistor 302 and a gate of the sixteenth PMOS transistor 319 each are connected to the external enable signal. A drain of the ninth NMOS transistor 302 is connected to the drain of the thirteenth PMOS transistor 232 in the output unit 108. A source of the ninth NMOS transistor 302 is connected to a gate and a drain of the tenth NMOS transistor 303, a gate of the eleventh NMOS transistor 304, the second-stage amplifier unit 111, and a drain of the twelfth NMOS transistor 305. A drain of the eleventh NMOS transistor 304 is connected to a source of the thirteenth NMOS transistor 306 and a source of the fourteenth NMOS transistor 307. A gate of the thirteenth NMOS transistor 306 is connected to the drain of the eleventh PMOS transistor 228 and one end of the sixth resistor 229 in the output unit 108. A drain of the thirteenth NMOS transistor 306 is connected to a gate and a drain of the fourteenth PMOS transistor 308, a gate of the fifteenth PMOS transistor 309, and a drain of the sixteenth PMOS transistor 319. A drain of the fifteenth PMOS transistor 309 is connected to a drain of the fourteenth NMOS transistor 307, the intermediate frequency zero generation unit 105, and the second-stage amplifier unit 111. A gate of the fourteenth NMOS transistor 307 is connected to the power output module 103. A source of the fourteenth PMOS transistor 308, a source of the fifteenth PMOS transistor 309, a source of the sixteenth PMOS transistor 319 are connected to the power supply voltage VDD. A source of the tenth NMOS transistor 303, a source of the eleventh NMOS transistor 304, and a source of the twelfth NMOS transistor 305 are all grounded.

As shown in FIG. 3, the second-stage amplifier unit 111 includes a fifteenth NMOS transistor 310 and a seventeenth PMOS transistor 311. A gate of the fifteenth NMOS transistor 310 is connected to the gate of the eleventh NMOS transistor 304. A drain of the fifteenth NMOS transistor 310 is connected to a drain of the seventeenth PMOS transistor 311 and the power output module 103. A gate of the seventeenth PMOS transistor 311 is connected to the drain of the fourteenth NMOS transistor 307 and the intermediate frequency zero generation unit 105. A source of the seventeenth PMOS transistor 311 is connected to the power supply voltage VDD. A source of the fifteenth NMOS transistor 310 is grounded.

As shown in FIG. 3, the intermediate frequency zero generation unit 105 includes a tenth resistor 317 and a fourth capacitor 318. One end of the tenth resistor 317 is connected to the drain of the fifteenth PMOS transistor 309 and the gate of the seventeenth PMOS transistor 311. The other end of the tenth resistor 317 is connected to one end of the fourth capacitor 318. The other end of the fourth capacitor 318 is grounded.

The first-stage amplifier unit 110, the second-stage amplifier unit 111, the power transistor 312, the eighth resistor Rf1, and the ninth resistor Rf2 form a negative feedback loop, so that an output voltage VOUT of the LDO circuit is less affected by changes of a power supply voltage and a load resistance.

Specifically, an enable signal ENB is obtained when the enable signal EN passes through the phase inverter 301. The enable signals EN and ENB control turn-on and turn-off of the ninth NMOS transistor 302, the twelfth NMOS transistor 305, the sixteenth PMOS transistor 319, and the sixteenth NMOS transistor 320 by using enable transistors to turn-on and turn-off of the first-stage amplifier unit 110 and the second-stage amplifier unit 111. The bandgap reference module 101 provides a bias current for the first-stage amplifier unit 110. Current mirrors are formed respectively by using the tenth NMOS transistor 303 and the eleventh NMOS transistor 304 and the tenth NMOS transistor 303 and the fifteenth NMOS transistor 310, and copy the reference current IBIAS to provide the bias current to the first-stage amplifier unit 110 and the second-stage amplifier unit 111. The bandgap reference module 101 provides a voltage reference for the first-stage amplifier unit 110. The first-stage amplifier unit 110 is a typical five-transistor amplifier. The thirteenth NMOS transistor 306 and the fourteenth NMOS transistor 307 are input amplifier pair transistors of the first-stage amplifier unit 110. The fourteenth PMOS transistor 308 and fifteenth PMOS transistor 309 are current mirror loads of the first-stage amplifier unit 110. The second-stage amplifier unit 111 is a common-source amplifier. The seventeenth PMOS transistor 311 is an amplifier transistor of the second-stage amplifier unit 111. The third capacitor 315 and the seventh resistor 316 form Miller compensation. A feedback resistor network 112 including the eighth resistor Rf1 and the ninth resistor Rf2, and together with the reference voltage VREF, determine a magnitude of the output voltage of the LDO circuit. The output voltage is $$VOUT = \frac{Rf1 + Rf2}{Rf2} \cdot VREF.$$

The tenth resistor 317 and the fourth capacitor 318 are connected in series to ground to form the intermediate frequency zero generation unit 105. A function of the intermediate frequency zero generation unit 105 is to generate a zero whose frequency is an intermediate frequency. The zero may change frequency response of the amplifier module 102 at the intermediate frequency, to improve power supply rejection performance of the intermediate frequency of the LDO circuit. A product of the tenth resistor 317 and the fourth capacitor 318 determines a frequency of the zero. The frequency of the zero is specifically expressed as $1/R_{317}C_{311}$. With respect to power supply rejection at the intermediate frequency, a frequency of an intermediate frequency zero of the bandgap reference module 101 and a frequency of an intermediate frequency zero generated by the intermediate frequency zero generation unit are adjusted in coordination to achieve a better optimization effect.

Figure 4:
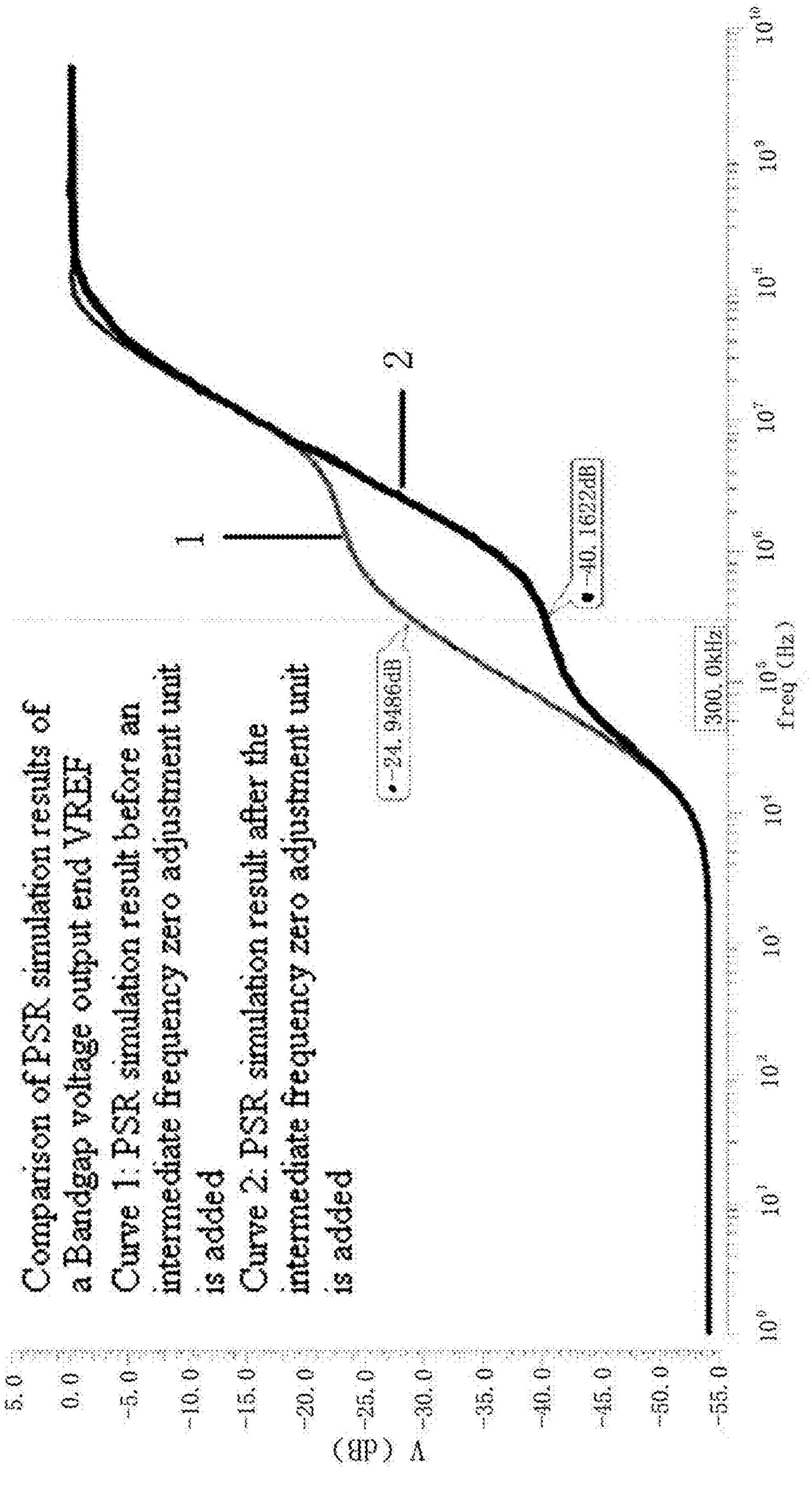
FIG. 4 is a comparison diagram of power supply rejection simulation results of a reference voltage output end of a bandgap reference module.

FIG. 4 shows comparison of power supply rejection (PSR) simulation results of a voltage output end of a bandgap reference module Bandgap. Curve 1 is a power supply rejection simulation result before an intermediate frequency zero adjustment unit is added to the bandgap reference module. Curve 2 is a power supply rejection simulation result after the intermediate frequency zero adjustment unit is added to the bandgap reference module. What is marked in the figure is power supply rejection at a frequency of 300 KHz. According to the simulation result, it can be learned that the power supply rejection at the frequency of 300 KHz is optimized by 11.2 dB after the intermediate frequency zero adjustment unit is added to the bandgap reference module.

Figure 5:
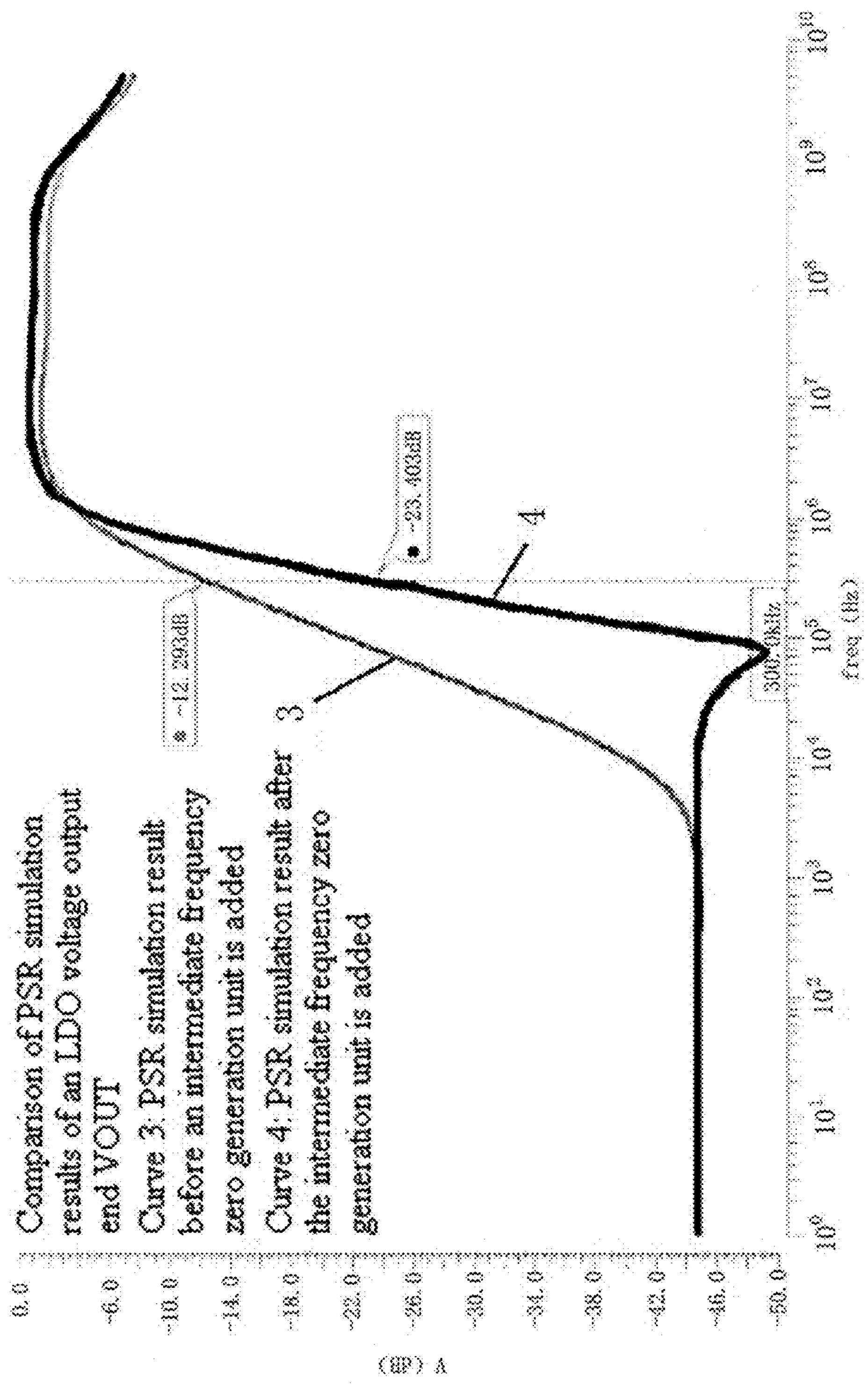
FIG. 5 is a comparison diagram of power supply rejection simulation results of a voltage output end VOUT of an LDO circuit.

FIG. 5 shows comparison of power supply rejection (PSR) simulation results of a voltage output end VOUT of an LDO circuit provided in the present invention. Curve 3 is a power supply rejection simulation result before an intermediate frequency zero generation unit is added to the LDO circuit. Curve 4 is a power supply rejection simulation result after the intermediate frequency zero generation unit is added to the LDO circuit. What is marked in the figure is power supply rejection at a frequency of 300 KHz. According to the simulation result, it can be learned that the power supply rejection at the frequency of 300 KHz is optimized by 11.1 dB after the intermediate frequency zero generation unit is added to the LDO circuit.

In addition, the LDO circuit having a power supply rejection function provided in the present invention may be used in an integrated circuit chip. Details of a specific structure of the LDO circuit having a power supply rejection function in the integrated circuit chip are not described herein.

The LDO circuit having a power supply rejection function may further be used in a communication terminal as an important part of a radio frequency integrated circuit. The communication terminal mentioned here refers to a device that may be used in a mobile environment, supports a variety of communication standards such as GSM, EDGE, TD-SCDMA, TDD-LTE and FDD-LTE, and includes a mobile phone, a laptop, a tablet, an internet of vehicles terminal, and the like. In addition, the technical solutions provided in the present invention are also applicable to a scenario that another radio frequency integrated circuit is used in, such as a communication base station and an intelligent connected vehicle.

Figure 6:
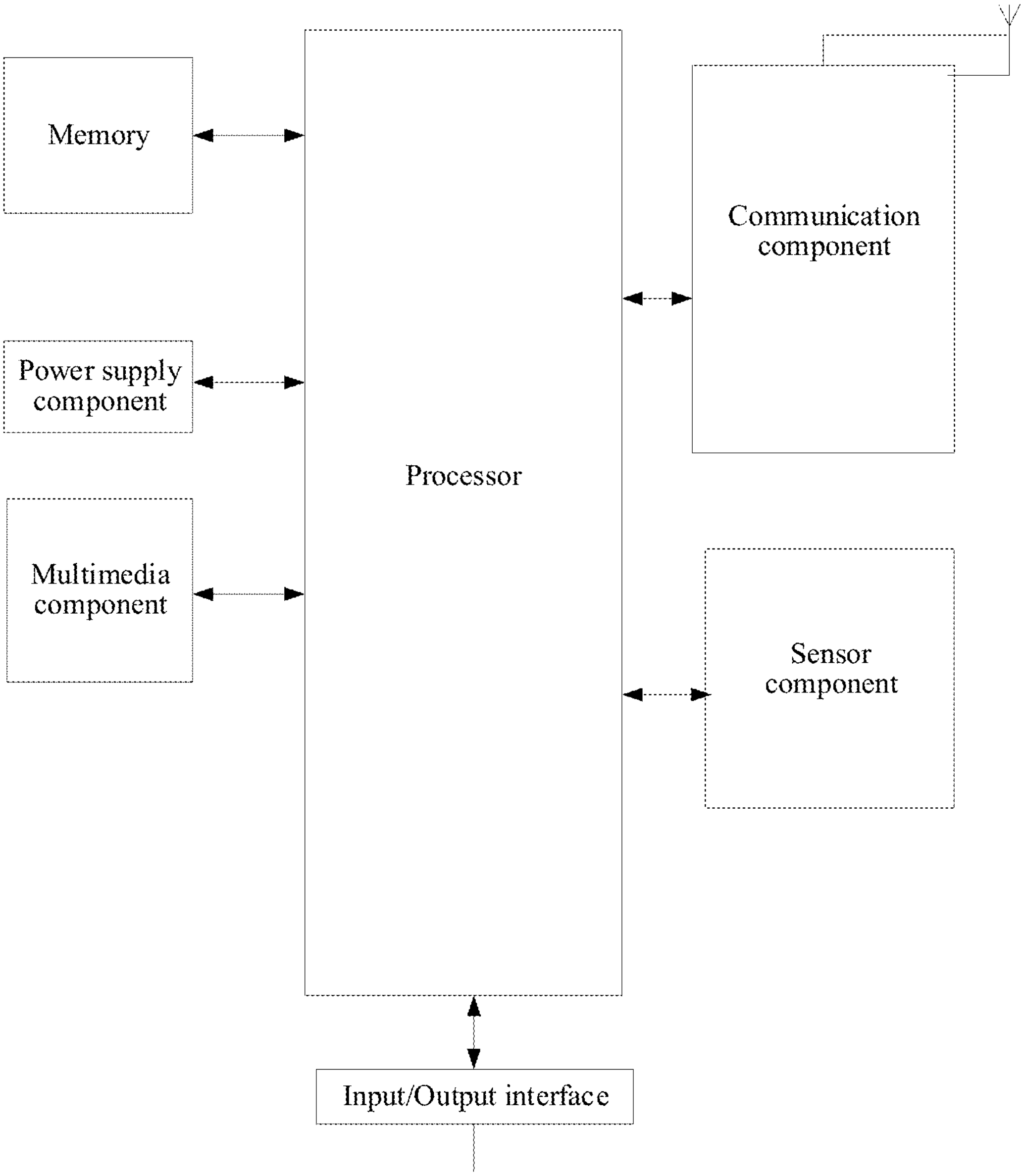
FIG. 6 is an example diagram of a communication terminal using an LDO circuit having a power supply rejection function.

As shown in FIG. 6, the communication terminal includes at least a processor and a memory, and may further include a communication component, a sensor component, a power supply component, a multimedia component, and an input/output interface according to actual needs. The memory, the communication component, the sensor component, the power supply component, the multimedia component, and the input/output interface are connected to the processor. The memory may be a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, or the like. The processor may be a central processing unit (CPU), a graphic processing unit (GPU), a field-programmable gate array (FPGA), an application-specific integrated circuit (ASIC), a digital signal processing (DSP) chip, or the like. Another communication component, sensor component, power supply component, multimedia component, and the like may be implemented by using a common component. Details are not described herein.

Compared with the conventional technologies, in the LDO circuit having a power supply rejection function provided in the present invention, with respect to power supply rejection at an intermediate frequency, the intermediate frequency zero adjustment unit in the bandgap reference module and the intermediate frequency zero generation unit in the LDO circuit are adjusted in coordination to better optimize intermediate frequency power supply rejection performance. When used as a voltage bias circuit of a radio frequency chip, the LDO circuit having the intermediate frequency power supply rejection function can enhance a capability of a radio frequency chip power supply to suppress intermediate frequency signals, thereby improving working performance of the radio frequency chip.

The foregoing content provides a detailed description of the LDO circuit having a power supply rejection function, the chip, and the communication terminal provided in the present invention. For a person of ordinary skill in the art, any apparent modification made to the present invention without departing from the principle of the present invention falls within the scope of protection of the patent rights of the present invention.

What is claimed is:

1. An LDO circuit having a power supply rejection function, comprising a bandgap reference module provided with an intermediate frequency zero adjustment unit, an amplifier module provided with an intermediate frequency zero generation unit, and a power output module, wherein the bandgap reference module is connected to the amplifier module, and the amplifier module is connected to the power output module;

wherein the bandgap reference module generates a reference voltage having a preset temperature coefficient by using a frequency of an intermediate frequency zero adjusted by the intermediate frequency zero adjustment unit and outputs the reference voltage to the amplifier module, and the reference voltage is used as a voltage reference of the LDO circuit and works in coordination with a zero that is generated by the intermediate frequency zero generation unit and whose frequency is an intermediate frequency, to adjust power supply rejection of the LDO circuit at an intermediate frequency;

wherein the bandgap reference module comprises a starting unit, a PTAT current generation unit, an output unit, and the intermediate frequency zero adjustment unit, an output end of the starting unit and an output end of the intermediate frequency zero adjustment unit are connected to an input end of the PTAT current generation unit, an output end of the PTAT current generation unit is connected to an input end of the output unit, and an output end of the output unit is connected to an input end of the amplifier module;

wherein the starting unit comprises a first PMOS transistor, a second PMOS transistor, a first resistor, a second resistor, a first NMOS transistor, a second NMOS transistor, a third PMOS transistor, a fourth PMOS transistor, a third NMOS transistor, and a fourth NMOS transistor, wherein a source of the first PMOS transistor and a source of the second PMOS transistor are connected to a power supply voltage; a drain of the second PMOS transistor is connected to one end of the first resistor; the other end of the first resistor is connected to a drain of the first PMOS transistor, a gate of the fourth PMOS transistor, and one end of the second resistor; the other end of the second resistor is connected to a gate and a drain of the first NMOS transistor; a drain of the fourth PMOS transistor is connected to a gate and a drain of the third NMOS transistor and a gate of the fourth NMOS transistor; a drain of the fourth NMOS transistor, a source of the fourth PMOS transistor, and a drain of the third PMOS transistor are connected to each other, and are connected to the PTAT current generation unit with a gate of the second PMOS transistor; a gate of the first PMOS transistor, a gate of the second NMOS transistor, and a gate of the third PMOS transistor each are connected to an external enable signal; the source of the first PMOS transistor, the source of the second PMOS transistor, and a source of the third PMOS transistor are connected to the power supply voltage; and a source of the second NMOS transistor, a source of the third NMOS transistor, and a source of the fourth NMOS transistor are grounded; and wherein the PTAT current generation unit comprises a fifth PMOS transistor, a sixth PMOS transistor, a seventh PMOS transistor, an eighth PMOS transistor, a ninth PMOS transistor, a third resistor, a fourth resistor, a fifth NMOS transistor, a sixth NMOS transistor, a seventh NMOS transistor, an eighth NMOS transistor, a fifth resistor, a first bipolar transistor, and a second bipolar transistor, wherein a gate of the fifth PMOS transistor is connected to the external enable signal; a drain of the fifth PMOS transistor, a gate of the sixth PMOS transistor, a gate of the seventh PMOS transistor, the gate of the second PMOS transistor, a drain of the ninth PMOS transistor, one end of the third resistor, and the output unit are connected to each other; a drain of the sixth PMOS transistor is connected to a source of the eighth PMOS transistor; a drain of the seventh PMOS transistor is connected to a source of the ninth PMOS transistor; a gate of the eighth PMOS transistor, a gate of the ninth PMOS transistor, the drain of the third PMOS transistor, the source of the fourth PMOS transistor, the other end of the third resistor, a drain of the seventh NMOS transistor, and the output unit are connected to each other; a drain of the eighth PMOS transistor is connected to one end of the fourth resistor, a gate of the fifth NMOS transistor, and a gate of the seventh NMOS transistor; the other end of the fourth resistor is connected to a drain of the fifth NMOS transistor, a gate of the sixth NMOS transistor, and a gate of the eighth NMOS transistor; a source of the fifth NMOS transistor is connected to a drain of the sixth NMOS transistor; a source of the seventh NMOS transistor is connected to a drain of the eighth NMOS transistor; a source of the sixth NMOS transistor is connected to an emitter of the first bipolar transistor; a source of the eighth NMOS transistor is connected to an emitter of the second bipolar transistor via the fifth resistor; a source of the fifth PMOS transistor, a source of the sixth PMOS transistor, and a source of the seventh PMOS transistor are connected to the power supply voltage; and a base and a collector of the first bipolar transistor and a base and a collector of the second bipolar transistor are all grounded.

2. The LDO circuit having the power supply rejection function according to claim 1, wherein the output unit comprises a tenth PMOS transistor, an eleventh PMOS transistor, a sixth resistor, a third bipolar transistor, a twelfth PMOS transistor, and a thirteenth PMOS transistor, wherein a gate of the tenth PMOS transistor and a gate of the twelfth PMOS transistor are connected to the drain of the ninth PMOS transistor and the intermediate frequency zero adjustment unit, a drain of the tenth PMOS transistor is connected to a source of the eleventh PMOS transistor, a drain of the twelfth PMOS transistor is connected to a source of the thirteenth PMOS transistor, a gate of the eleventh PMOS transistor and a gate of the thirteenth PMOS transistor are connected to the other end of the third resistor and the intermediate frequency zero adjustment unit, a drain of the eleventh PMOS transistor and one end of the sixth resistor are connected to the amplifier module, the other end of the sixth resistor is connected to an emitter of the third bipolar transistor, a drain of the thirteenth PMOS transistor is connected to the amplifier module, a source of the tenth PMOS transistor and a source of the twelfth PMOS transistor are connected to the power supply voltage, and a base and a collector of the third bipolar transistor are grounded.

3. The LDO circuit having the power supply rejection function according to claim 2, wherein the intermediate frequency zero adjustment unit comprises a first capacitor and a second capacitor; one end of the first capacitor and one end of the second capacitor are connected to the power supply voltage; the other end of the first capacitor is connected to the gate of the sixth PMOS transistor, the gate of the seventh PMOS transistor, the gate of the tenth PMOS transistor, and the gate of the twelfth PMOS transistor; and the other end of the second capacitor is connected to the gate of the eighth PMOS transistor, the gate of the ninth PMOS transistor, the gate of the eleventh PMOS transistor, and the gate of the thirteenth PMOS transistor.

4. The LDO circuit having the power supply rejection function according to claim 1, wherein the amplifier module comprises a first-stage amplifier unit, a second-stage amplifier unit, and the intermediate frequency zero generation unit, and wherein the intermediate frequency zero generation unit is configured between the first-stage amplifier unit and the second-stage amplifier unit, and the first-stage amplifier unit is connected to the second-stage amplifier unit and the power output module.

5. The LDO circuit having the power supply rejection function according to claim 1, wherein the intermediate frequency zero generation unit comprises a tenth resistor and a fourth capacitor connected in series to ground.

6. An integrated circuit chip, comprising the LDO circuit having the power supply rejection function according to claim 1.

7. A communication terminal, comprising the LDO circuit having the power supply rejection function according to claim 1.

* * * * *